(12) United States Patent　　(10) Patent No.:　　US 9,377,056 B2
Foote　　(45) Date of Patent:　　Jun. 28, 2016

(54) BEARING STACK FOR A DOWN-HOLE DRILLING MOTOR

(71) Applicant: Cathedral Energy Services Ltd., Nisku (CA)

(72) Inventor: Dean Norman Foote, Edmonton (CA)

(73) Assignee: Cathedral Energy Services Ltd., Nisku, Alberta (CA)

( * ) Notice: Subject to any disclaimer, the term of this patent is extended or adjusted under 35 U.S.C. 154(b) by 0 days.

(21) Appl. No.: 14/603,391

(22) Filed: Jan. 23, 2015

(65) Prior Publication Data

US 2016/0091024 A1　Mar. 31, 2016

Related U.S. Application Data

(60) Provisional application No. 62/058,094, filed on Sep. 30, 2014.

(51) Int. Cl.
*F16C 19/54* (2006.01)
*F16C 35/073* (2006.01)
*F16C 35/06* (2006.01)
*F16C 43/00* (2006.01)

(52) U.S. Cl.
CPC ............. *F16C 35/073* (2013.01); *F16C 19/541* (2013.01); *F16C 35/061* (2013.01); *F16C 43/00* (2013.01)

(58) Field of Classification Search
CPC .... F16C 35/073; F16C 19/541; F16C 35/061; F16C 43/00
See application file for complete search history.

(56) References Cited

U.S. PATENT DOCUMENTS

| | | | |
|---|---|---|---|
| 3,272,520 A | 9/1966 | Woolfenden | |
| 4,260,031 A | 4/1981 | Jackson, Jr. | |
| 4,493,373 A | 1/1985 | Jackson | |
| 4,577,704 A | 3/1986 | Aumann | |
| 5,131,666 A | 7/1992 | Hutchens | |
| 5,660,481 A | 8/1997 | Ide | |
| 5,690,434 A * | 11/1997 | Beshoory | E21B 4/003 175/107 |
| 5,964,307 A | 10/1999 | Wenzel | |

(Continued)

OTHER PUBLICATIONS

TomaHawk SuperHawk Service Manual, URL=http://www.tomahawkdh.com/images/Tomallawk_SuperHawk_Service_Manual_Rev_2_2008.pdf, published at least as early as Apr. 25, 2012, 30 pages.

*Primary Examiner* — Thomas R. Hannon
(74) *Attorney, Agent, or Firm* — Davis & Bujold PLLC; Michael J. Bujold

(57) ABSTRACT

There is provided a method of assembling a bearing assembly, having the steps of mounting a bearing stack on an inner mandrel, the bearing stack having a plurality of inner and outer races, compressing the plurality of inner races between first and second inner shoulders to within a predetermined range of compressive loads, the first and second inner shoulders being carried by the inner mandrel, inserting the inner mandrel and bearing stack into an outer housing, compressing the plurality of outer races between first and second outer shoulders to within a predetermined range of compressive loads, the first and second outer shoulders being carried by the housing, wherein at least one of the first outer shoulder and the second outer shoulder comprises a deformable shim that follows a deformation curve having at least a plastic deformation component when compressed across the predetermined range of compressive loads.

20 Claims, 16 Drawing Sheets

(56) References Cited

U.S. PATENT DOCUMENTS

| | | |
|---|---|---|
| 5,964,414 A | 10/1999 | Hardy et al. |
| 6,202,762 B1 | 3/2001 | Fehr et al. |
| 6,334,713 B1 | 1/2002 | Chu |
| 7,500,787 B2 | 3/2009 | Cioceanu |
| 7,762,356 B2 | 7/2010 | Turner et al. |
| 2007/0092169 A1* | 4/2007 | Johnson ................ F16C 19/10 384/97 |
| 2008/0190669 A1* | 8/2008 | Cioceanu ................ E21B 4/02 175/320 |
| 2009/0272581 A1 | 11/2009 | Beylotte et al. |
| 2010/0326730 A1 | 12/2010 | Prill et al. |
| 2011/0012455 A1 | 1/2011 | Scott |

\* cited by examiner

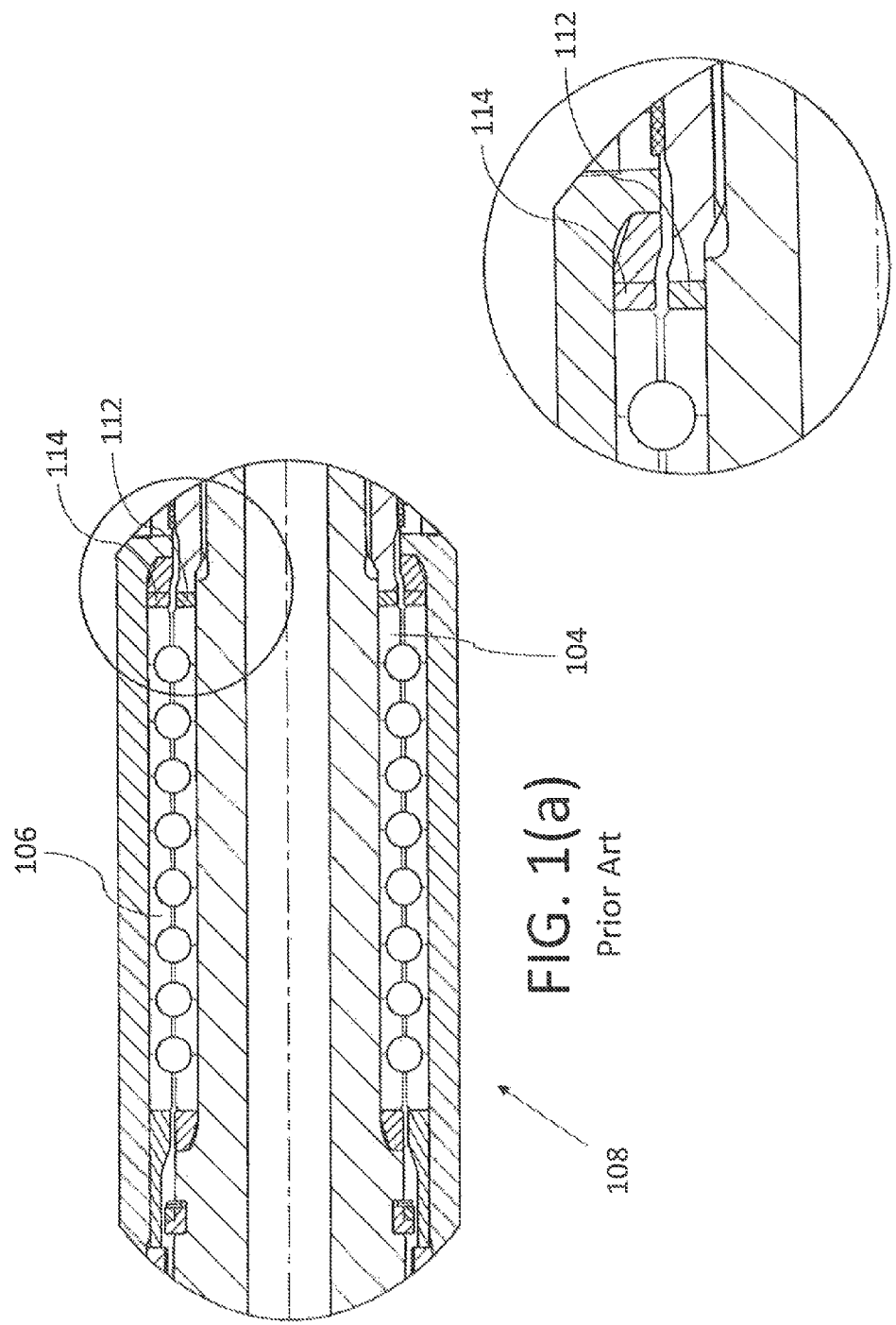

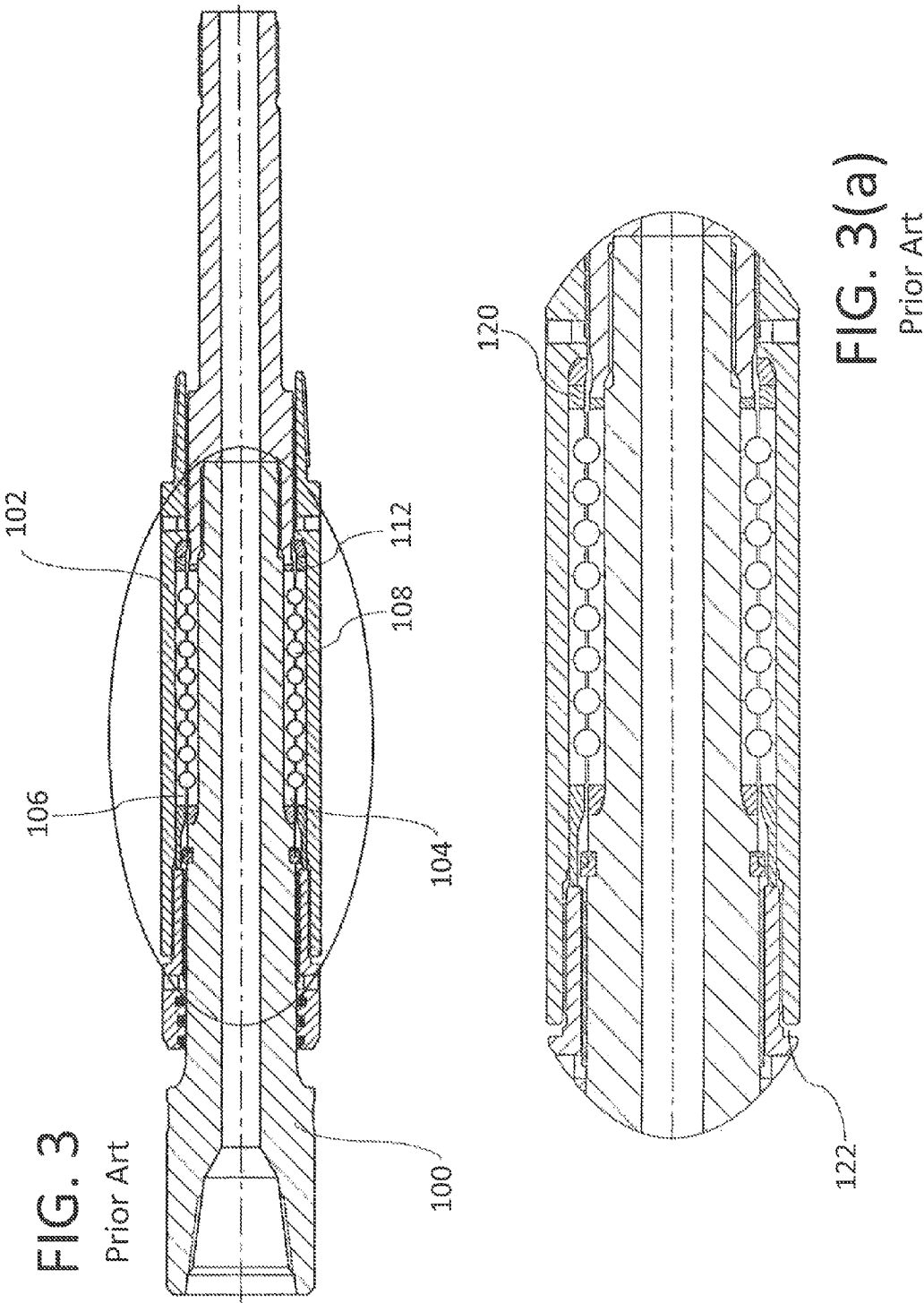

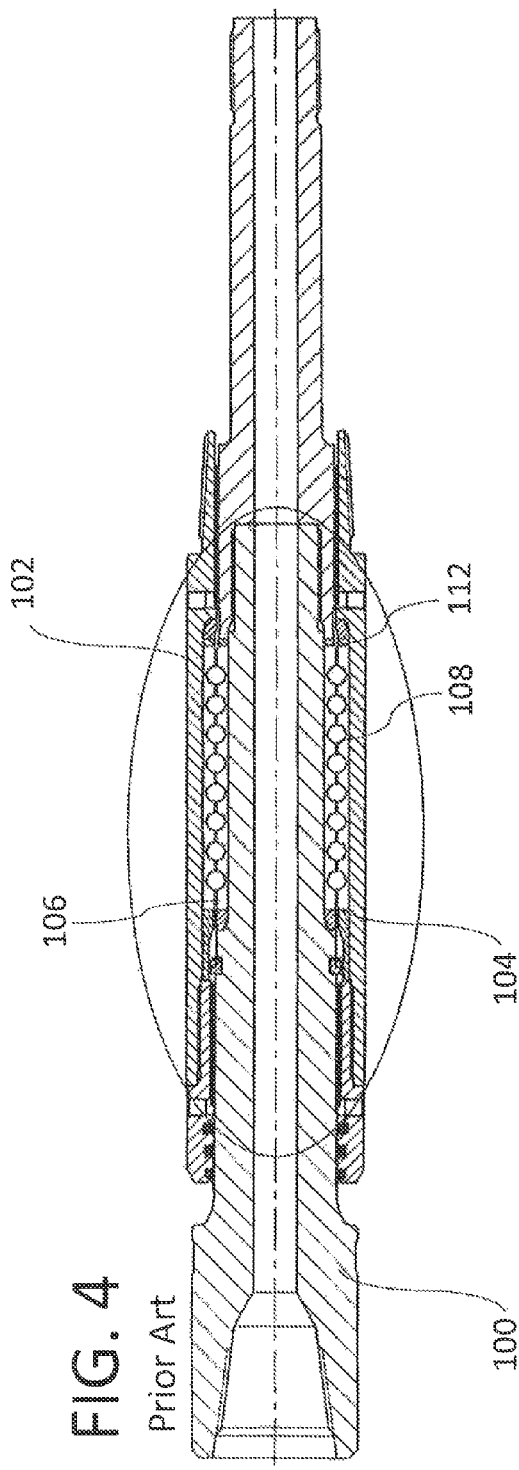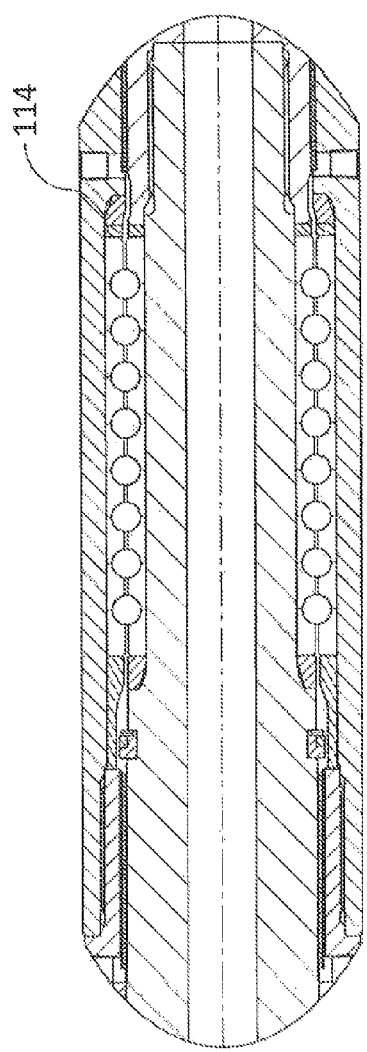
FIG. 4
Prior Art
FIG. 4(a)
Prior Art

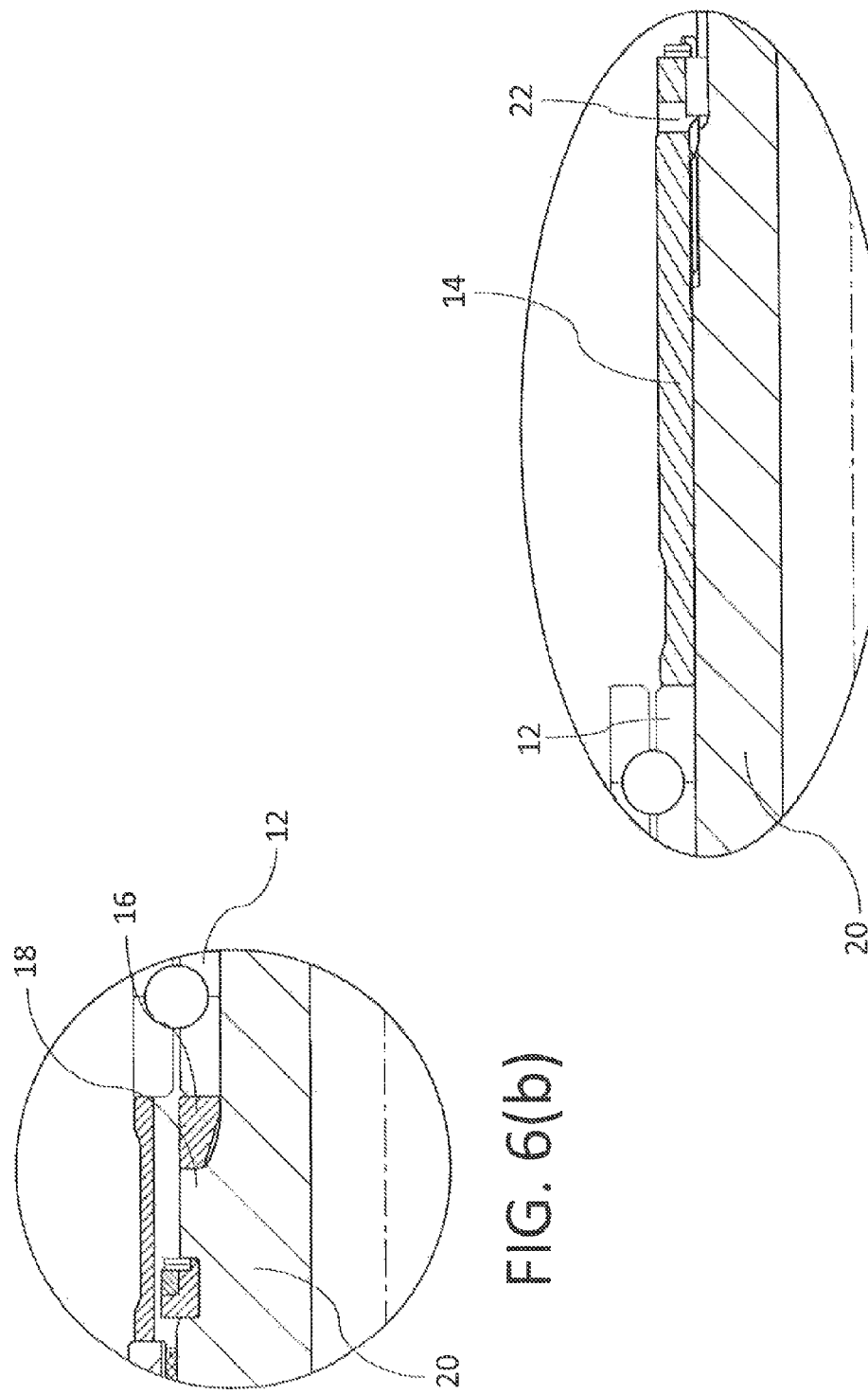

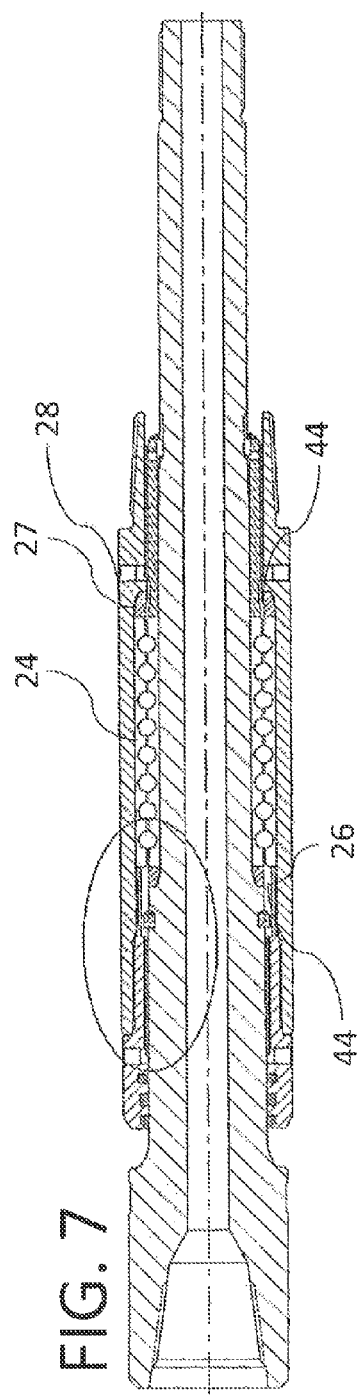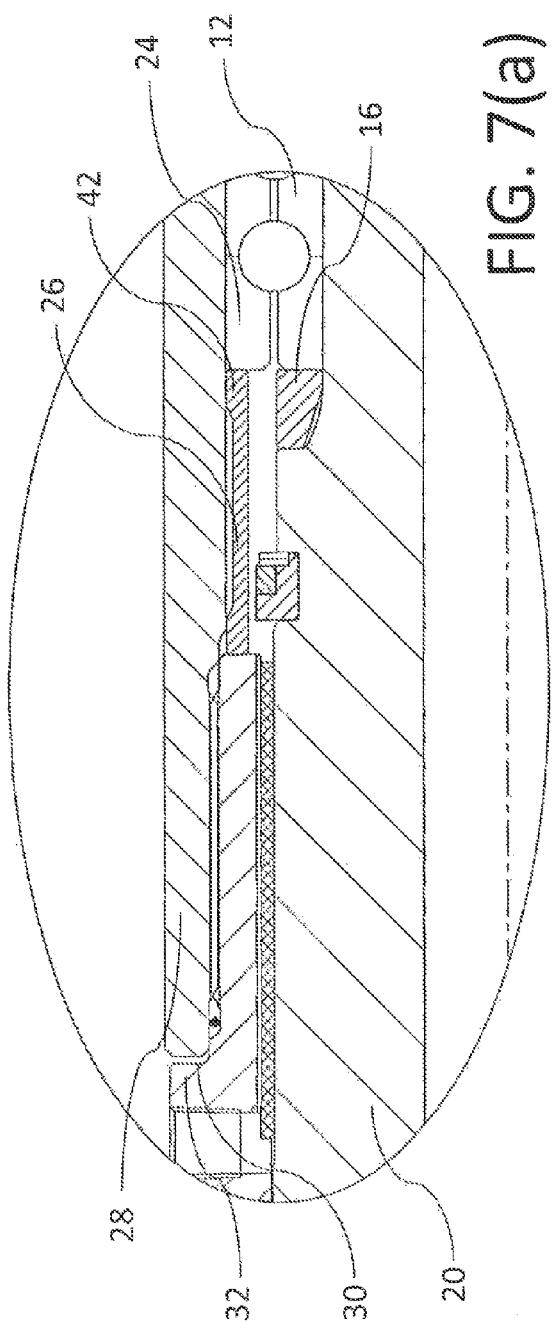

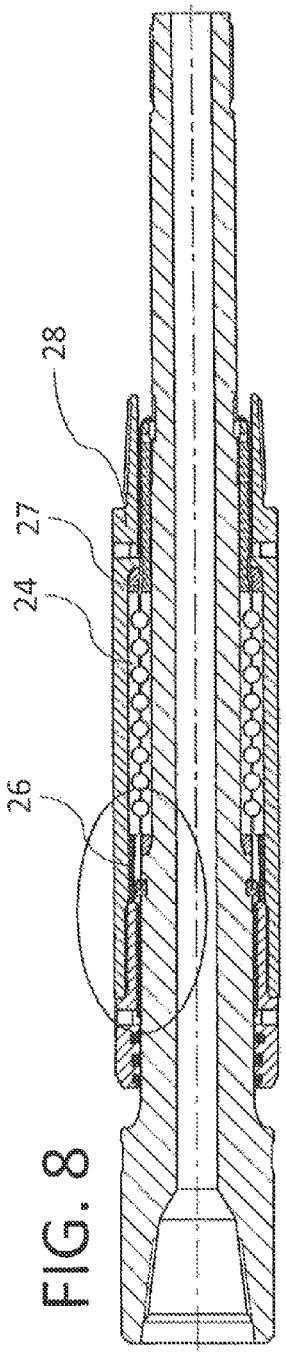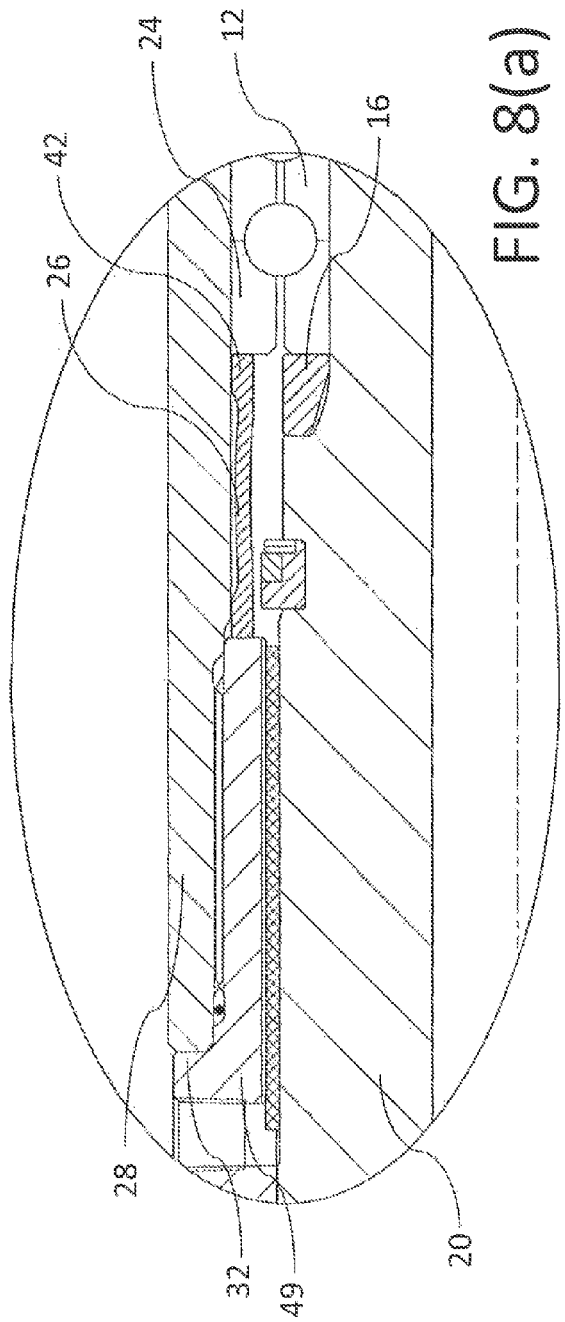

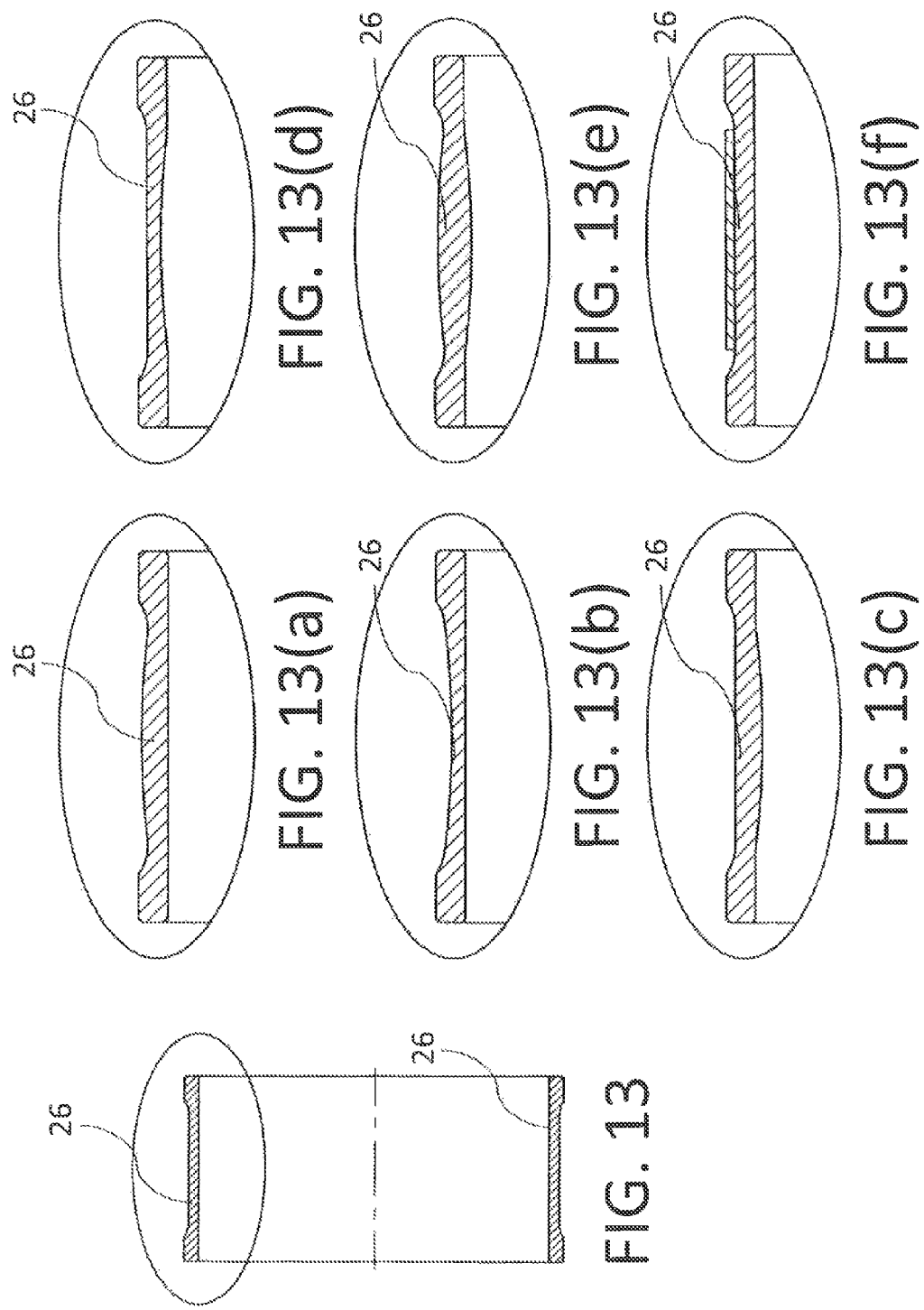

BEARING STACK FOR A DOWN-HOLE DRILLING MOTOR

TECHNICAL FIELD

This relates to a bearing assembly in a down-hole drilling motor and a method of clamping the inner and outer bearing races of a bearing stack in a down-hole drilling motor.

BACKGROUND

In hearing stacks, angular contact ball bearings are arranged in a manner that provides increased capacity with successive rows of ball bearings. In high capacity applications, such as down-hole drilling motors, it is not uncommon to have eight or more rows to accommodate the required loads. Each additional row of ball bearings requires the addition of a "shaft bearing race" and a "housing bearing race". To operate properly and prevent damage to the bearing stack, the shaft bearing races that rotate with the shaft must be "clamped" axially to prevent any one or more shah bearing races rotating independently of the others in the shaft bearing race stack. Additionally, the housing bearing races must be clamped to remain stationary with the housing to ensure all races in the housing bearing race stack rotate together and prevent any housing bearing races from rotating independently of the others. If the shaft or housing bearing races are not clamped to prevent relative rotation with respect to an adjacent bearing race, the surfaces between those races can wear and the stack does not perform as desired. Worn surfaces between adjacent bearing races will reduce the axial clamping force on the stacked races. This in turn causes additional individual rotation and increased wear between adjacent clamped surfaces. The result is uneven load sharing between rows of ball bearings and ultimately premature ball bearing and race failure.

Referring to FIGS. 1, 1a and 1b, with respect to shaft 100 and housing 102, the common method used to achieve an adequate clamping three for the inner races 104 and outer races 106 of the bearing stack 108 involves accurate measurement, assembly, disassembly and final assembly of shaft 100 and housing 102 components. The depicted bearing assembly 110 is an oil sealed unit. Mud lubricated bearing assemblies are another type that uses a similar approach to clamping shaft and housing bearing races. When the shaft connection is assembled and torqued, a shim 112 of a particular length must be selected to apply an appropriate clamping force to shaft bearing races 104 when the stack is assembled. The desired axial clamping force must be adequate to ensure that all shah bearing races 104 remain stationary with shaft 100, but not of a magnitude that will plastically deform, or crush, the Shaft bearing races 104. A similar shim 114 is used to apply an appropriate clamping force to housing bearing races 106. In some assemblies, the tolerance of the shim width can be as small as 0.005 inches to operate properly.

The applied axial threes to the two sets of bearing races, i.e. the shaft and housing bearing races, should provide the same axial deflection in compression in both the shaft bearing races and the housing bearing races. This will ensure favourable load sharing between the rows of ball bearings and maintain the proper axial movement between on-bottom and off-bottom loading.

Referring to FIGS. 2, 2a and 2b, a common method used for shaft shim 112 selection is depicted. The drilling motor is assembled to the stage as shown in FIG. 2. The space 116 between the bearing stack 108 and shim shoulder 118 of the shaft connection is measured and an appropriate length for shaft shim 112 is selected to provide the desired clamping force to the shaft bearing races 104. The shaft connection is then disassembled, the selected shim 112 installed, and the connection re-installed and torqued tight.

The method used for the selection of housing shim 114 is described with reference to FIGS. 3, 3a, 4a and 4b. The drilling motor is assembled to the stage as shown in FIGS. 3 and 3a. An oversized shim 120 of a known length is utilized to provide a gap 122 at the shoulder of the housing connection, FIG. 3a. The gap 122 is measured, the bearing housing 102 disassembled, and the appropriate length housing shim 114 is installed, FIGS. 4 and 4a. The bearing housing 102 is then reinstalled and the housing connection torqued tight.

Although the procedure appears straight forward, many situations arise that tend to lengthen the assembly procedure. For instance, when the shims 112 and 114 are installed and the connections are torqued tight, the "end play" for on-bottom and off-bottom loading is checked to ensure the shaft bearing races 104 and the housing bearing races 106 have been clamped appropriately. If not, the assembly and shim process must be repeated. If the correct shim is not available for either the shaft or housing, then shims must be modified or machined to the correct width to complete the assembly. It is not uncommon to take several hours to complete this task if mistakes are made in the process. The installing and removing the assembled parts can be difficult and time consuming.

SUMMARY

According to an aspect, there is provided a method of assembling a bearing assembly, comprising the steps of mounting a bearing stack on an inner mandrel, the bearing stack comprising a plurality of inner races and a plurality of outer races, compressing the plurality of inner races between a first inner shoulder and a second inner shoulder to within a predetermined range of compressive loads, the first and second inner shoulders being carried by the inner mandrel, inserting the inner mandrel and bearing stack into an outer housing, compressing the plurality of outer races between a first outer shoulder and a second outer shoulder to within a predetermined range of compressive loads, the first and second outer shoulders being carried by the housing, wherein at least one of the first outer shoulder and the second outer shoulder comprises a deformable shim that follows a deformation curve having at least a plastic deformation component when compressed across the predetermined range of compressive loads.

According to another aspect, compressing the plurality of outer races may comprise plastically deforming the deformable shim.

According to another aspect, the deformable shim may be plastically deformed by at least 0.005 inches.

According to another aspect, the deformable shim may be plastically deformed by at least 0.030 inches.

According to another aspect, the deformable shim may be plastically deformed by no more than 0.060 inches.

According to another aspect, the deformation curve may further comprise an elastic deformation component.

According to another aspect, the method may further comprise the step of manufacturing the deformable shim with a shaped profile that achieves a desired deformation curve.

According to another aspect, compressing the plurality of inner races may comprise threading a sleeve onto the mandrel section, the mandrel section carrying the first inner shoulder and the sleeve carrying the second inner shoulder.

According to another aspect, the housing may comprise a first housing section and a second housing section, and compressing the plurality of outer races may comprise threading the first housing section onto the second housing section, the first housing section carrying the first outer shoulder and the second housing section carrying the second outer section.

According to another aspect, the first housing section and the second housing section may sealingly engage the inner mandrel on either side of the bearing stack.

According to another aspect, at least one other of the first inner shoulder and the second inner shoulder may comprise a non-deformable shim.

According to an aspect, there is provided a bearing assembly comprising an inner mandrel, an outer housing rotatably mounted to the inner mandrel, and a bearing stack mounted between the inner mandrel and the outer housing, the bearing stack comprising a plurality of inner races compressively mounted between a first inner shoulder and a second inner shoulder to within a predetermined range of compressive loads, the first and second inner shoulders being carried by the inner mandrel, a plurality of outer races compressively mounted between a first outer shoulder and a second outer shoulder to within the predetermined range of compressive loads, the first and second outer shoulders being carried by the outer housing, and at least one of the first outer shoulder and the second outer shoulder comprising a deformable shim that follows a deformation curve that has at least a plastic deformation component when compressed across the predetermined range of compressive loads.

According to another aspect, the deformable shim may be plastically deformed by at least 0.005 inches as it is compressed to within the predetermined range of compressive loads.

According to another aspect, the deformable shim may be plastically deformed by at least 0.030 inches as it is compressed to within the predetermined range of compressive loads.

According to another aspect, the deformable shim may be plastically deformed by no more than 0.060 inches as it is compressed to within the predetermined range of compressive loads.

According to another aspect, the deformation curve may further comprise an elastic deformation component.

According to another aspect, the deformable shim may comprise a shaped profile that defines a cavity into which the deformable shim deforms under the compressive load.

According to another aspect, the inner mandrel may comprise a first mandrel section that carries the first inner shoulder and a sleeve section that carries the second inner shoulder, the sleeve section being connected to the first mandrel section by a mandrel threaded connection, and wherein the compressive load applied to the inner races is adjusted by adjusting the threaded connection.

According to another aspect, the outer housing may comprise a first housing section that carries the first outer shoulder and a second housing section that carries the second outer shoulder, the second housing section being connected to the first housing section by a housing threaded connection, and wherein the compressive load applied to the outer races is adjusted by adjusting the housing threaded connection.

According to another aspect, the first housing section and the second housing section may sealingly engage the inner mandrel on either side of the bearing stack.

According to another aspect, at least one of the first inner shoulder and the second inner shoulder may comprise a non-deformable shim.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 1a and-1b are detailed views in section of the bearing assembly shown in FIG. 1.

FIG. 3 is a side elevation view in section of a partially assembled prior art bearing assembly with the bearing housing and an oversized shim installed.

FIG. 3a is a side elevation view in section of the bearing assembly in FIG. 3.

FIG. 4 is a side elevation view in section of the prior art bearing assembly process being finally assembled.

FIG. 4a is a side elevation view in section of the bearing assembly in FIG. 4.

FIGS. 6a-6c are detailed side elevation views in section of the bearing assembly in FIG. 6.

FIG. 7 is a side elevation views in section of a partially assembly process to demonstrate the procedure for clamping the housing bearing races, preferred embodiment.

FIG. 7a is a detail cross-section view of FIG. 7, preferred embodiment.

FIG. 8 is a cross section view of the final assembly for clamping the housing bearing races, preferred embodiment.

FIG. 8a is a detail cross-section view of FIG. 8, preferred embodiment.

FIG. 12 is an illustration of the load/deflection curve for the alternate embodiment, FIGS. 11-11a.

FIG. 13 is a detailed cross-section view of the preferred embodiment.

FIG. 13a-13f are detailed cross-section views of alternate embodiments

DETAILED DESCRIPTION

Figure 1:
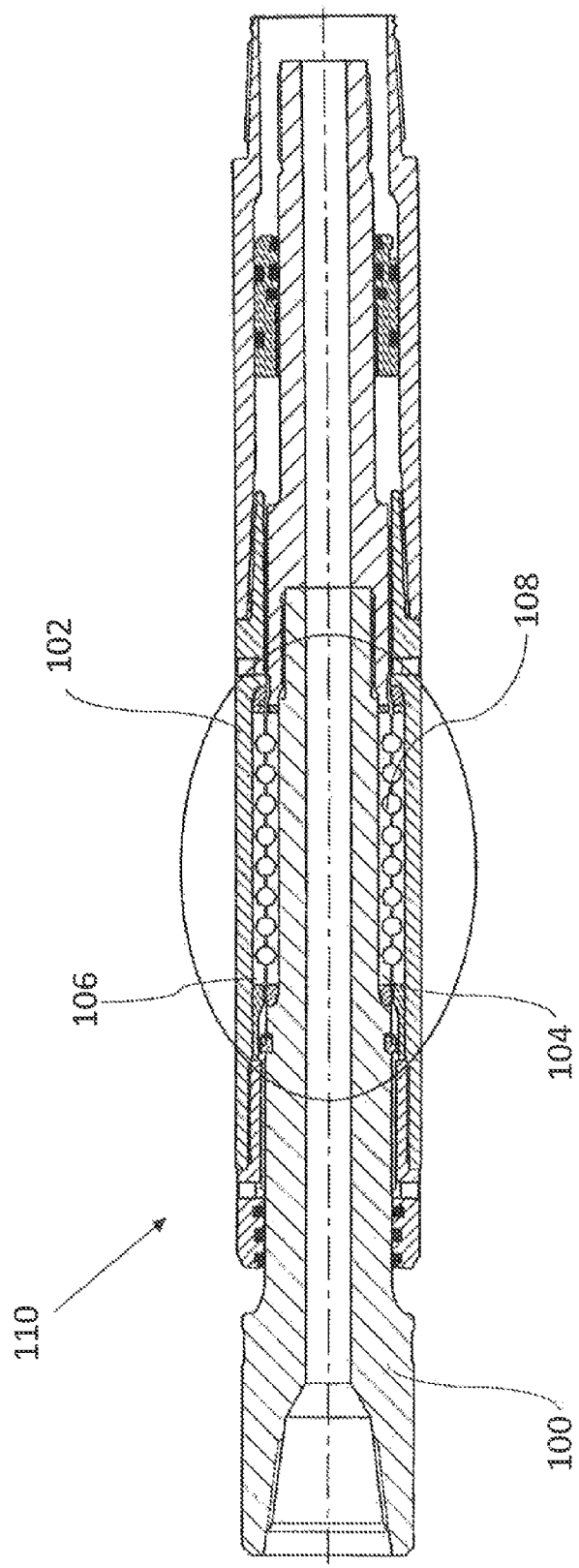
FIG. 1 is a side elevation view in section of a prior art oil lubricated bearing assembly.
Figure 2:
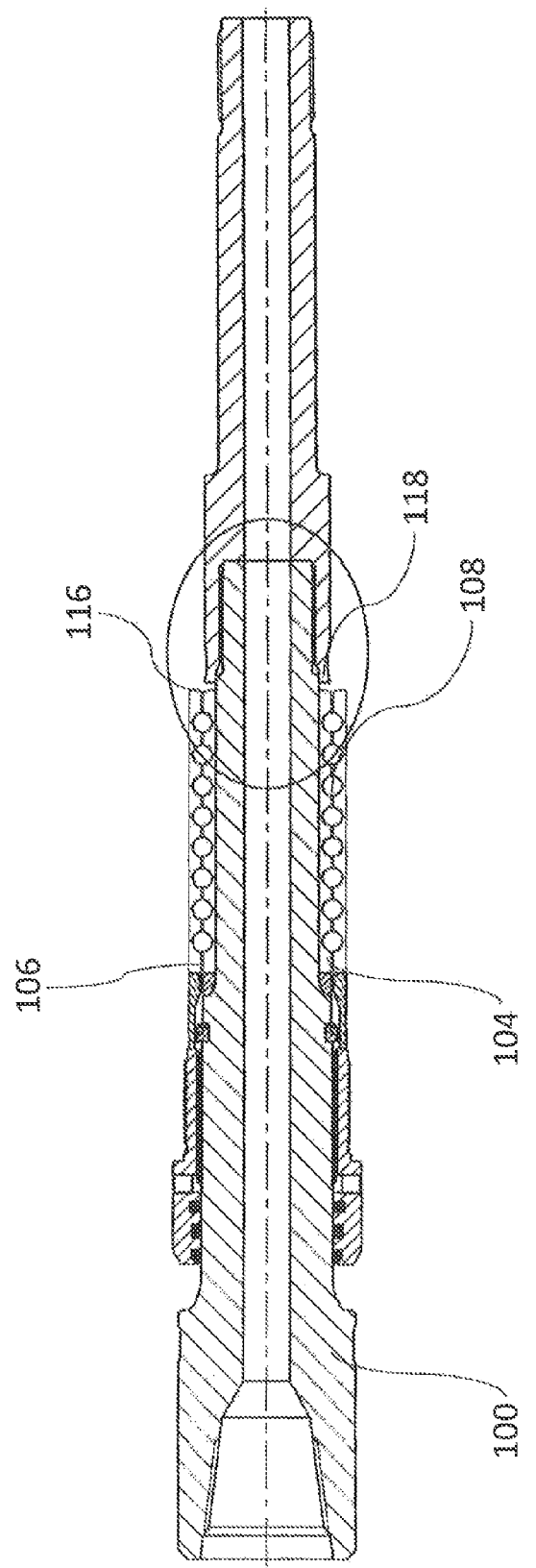
FIG. 2 is a side elevation view in section of a partially-assembled prior art bearing assembly.
Figure 2A:
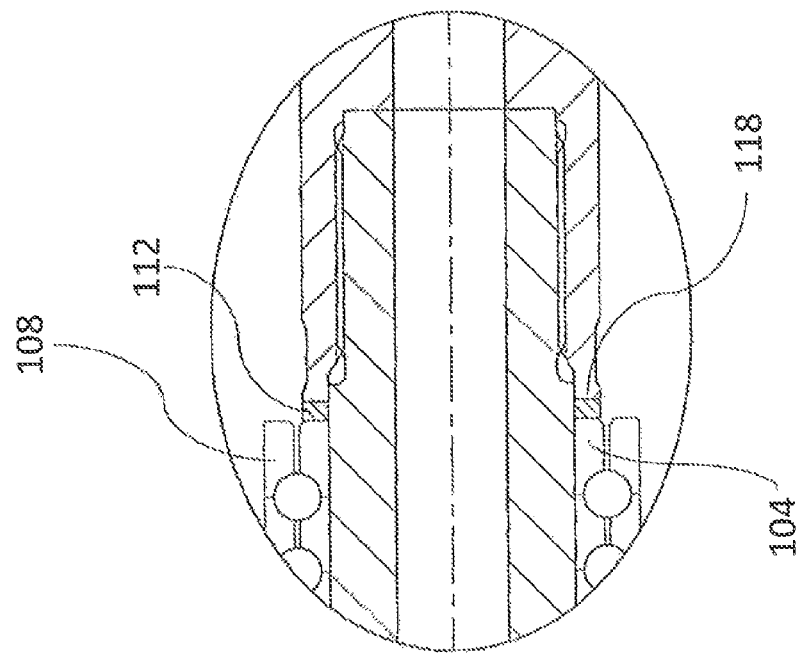
FIGS. 2a-2b are detailed side elevation views in section of the bearing assembly in FIG. 2.
Figure 2B:
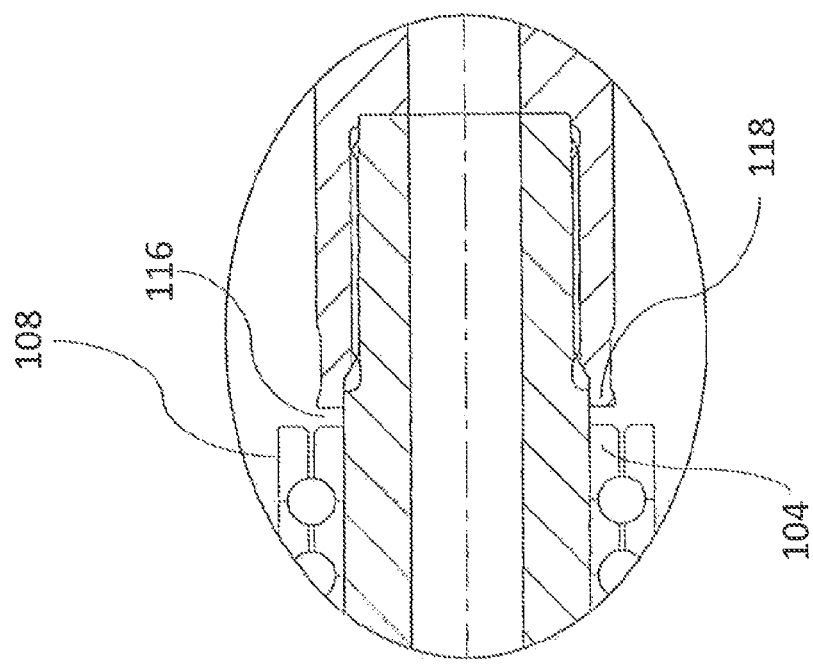

A bearing assembly generally identified by reference numeral 10, will now be described with reference to FIG. 5 through 13.

Figure 5:
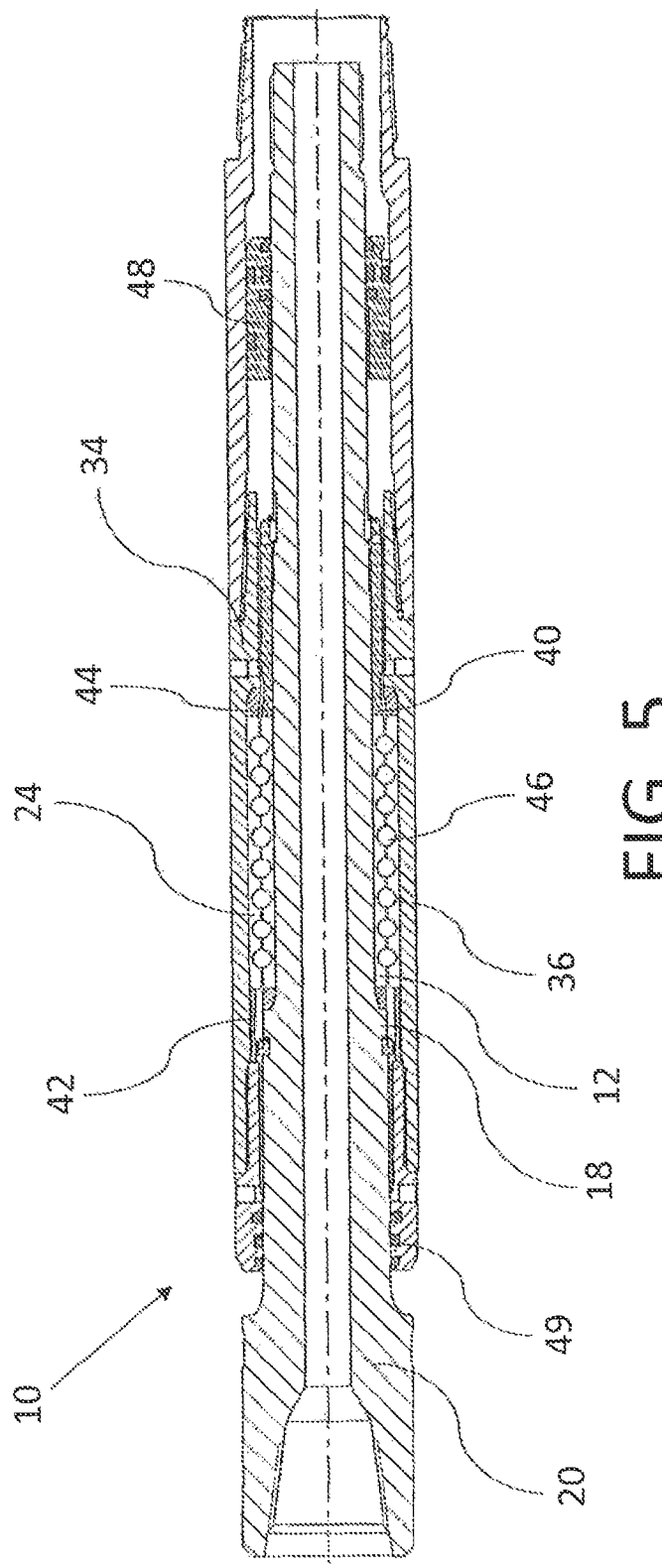
FIG. 5 is a side elevation view in section of a bearing assembly preferred embodiment.

Referring to FIG. 5, there is shown an example of a bearing assembly 10 built in accordance with the teachings contained herein. Depicted bearing assembly 10 has been found to be easier to assemble and with improved accuracy with respect to the required clamping forces. Bearing assembly 10 has shaft or inner mandrel 20, and outer housing 34. As shown, bearing assembly is a sub that is designed to be installed in a drill string above a drill bit (not shown), where outer housing 34 is attached to the outer tubular of the drill string, and inner mandrel is attached to the rotating mandrel of the drill string, as is known in the art. Accordingly, outer housing 34 is rotatably mounted to inner mandrel 20, and has a bearing stack 36 mounted between inner mandrel 20 and outer housing 34. Bearing stack 36 has a plurality of inner races or shaft bearing races 12 that are mounted between a first inner shoulder 18 and a second inner shoulder 40 to within a predetermined range of compressive loads, first inner shoulder 18 and second inner shoulder 40 being carried by inner mandrel 20. The predetermined range of compressive loads for shaft hearing races 12 gives the force that is needed to be applied to the shaft bearing races 12 to ensure that they remain stationary and prevent independent rotation and wear. Bearing stack 36 also has a plurality of outer races or housing races 24 that are mounted between a first outer shoulder 42 and a second outer shoulder 44 to within a predetermined range of compressive loads, first outer shoulder 42 and second outer shoulder 44 being carried by outer housing 34. Contained between inner races 12 and outer races 24 is a plurality of ball bearings 46. The depicted example is an oil sealed unit, however, it will be understood that the hearing assembly may also be a mud lubricated bearing assembly. Referring to FIG. 5, the depicted outer housing 34 sealingly engages the inner mandrel 20 on either side of the bearing stack 36, such as by using a pressure-compensating seal piston 48 upstream of bearing stack 36 in FIG. 5 and a sealing sleeve 49 downstream of the bearing stack 36. The outer housing 34 is threaded onto the sealing sleeve 49 such that they rotate together, and such that, as will be explained below, the sealing sleeve 49 applies a compressive force to the bearing stack 36. Other sealing assemblies may be used, as will be understood by one skilled in the art.

Figure 6:
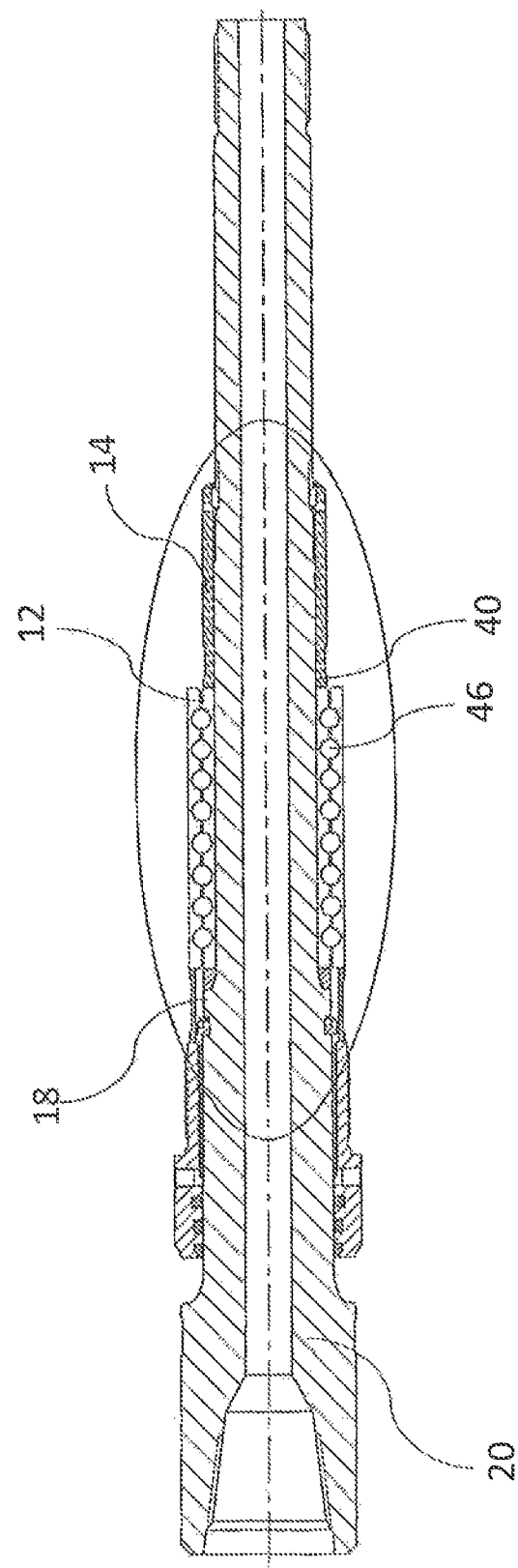
FIG. 6 is a side elevation view in section of the assembly process to demonstrate the procedure for clamping the shah bearing races, preferred embodiment.
Figure 6A:
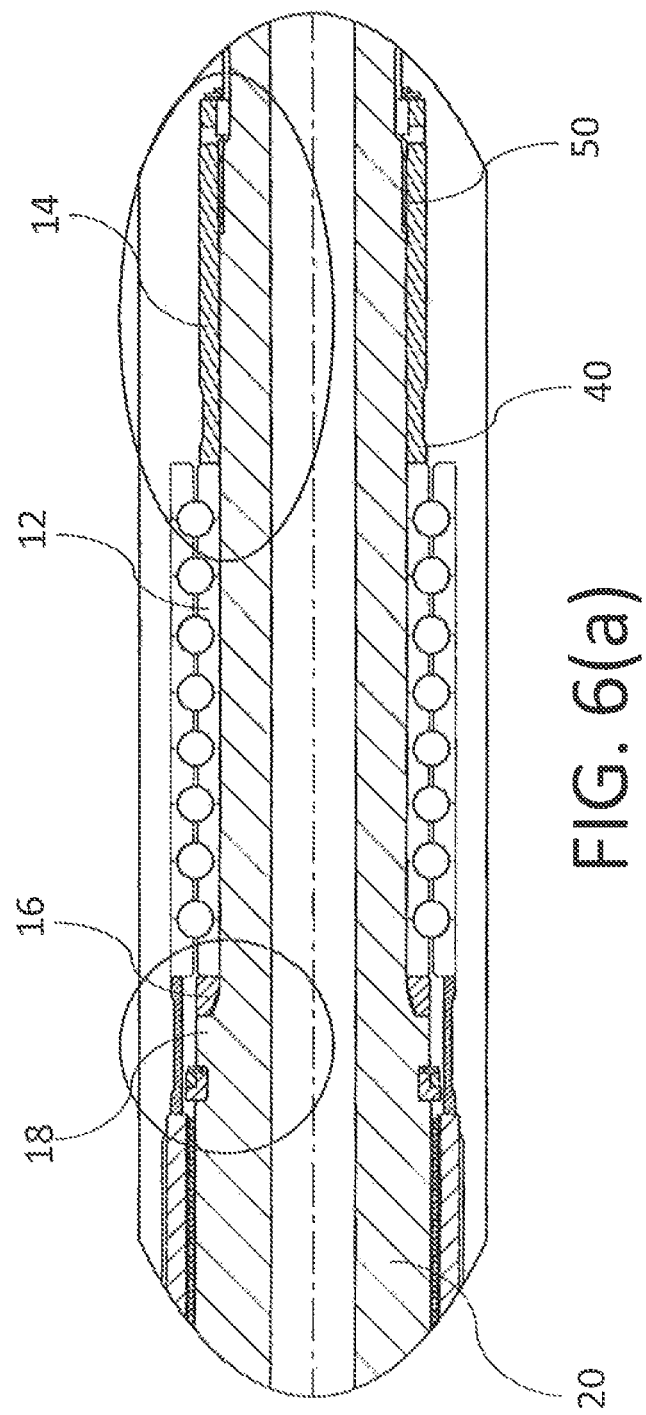

Referring to FIGS. 6, 6a, 6b and 6c, the shall or inner mandrel 20 is shown with the bearing race 12 clamped. Inner mandrel 20 carries a first inner shoulder 18 and the inner bearing race 12 is clamped by a partially threaded thrust sleeve 14, shown in FIGS. 6a and 6c. Thrust sleeve 14 carries the second inner shoulder 40, and is attached to the inner mandrel 20 by a mandrel threaded connection 50. Thrust sleeve 14 applies axial thrust to the shaft bearing races 12 and a shaft thrust spacer 16 and shoulder of the shaft 18, as shown in FIGS. 6a and 6b. The required axial load is achieved through the amount of torque applied to the threaded thrust sleeve 14. As such, there is no need for a shim to set a particular distance or clamp force. The thread available on the threaded thrust sleeve 14 is in excess of the actual thread required, as shown in FIG. 6c, and thrust sleeve 14 will only use what is needed to achieve the desired axial load from the specified torque. The compressive load applied to inner races 12 may be adjusted by adjusting the threaded connection between inner mandrel 20 and thrust sleeve 14. Once torqued, the thrust sleeve 14 is locked to the shaft 20 to prevent any rotation of the thrust sleeve 14. In a preferred embodiment, thrust sleeve 14 may be locked to shaft 20 using a locking pin mechanism. For example, thrust sleeve 14 may be provided with openings 22 that may be fitted with pins (not shown) that can be dropped into place to lock with openings in shaft 20. This arrangement allows for the elimination of the bellville spacer between the thrust sleeve 14 and the shaft bearing races 12 that was commonly used in the prior art. Thrust sleeve 14 in this new method is torqued to a specific value to apply the appropriate axial force on the shaft bearing races 12 to prevent individual race rotation.

In the embodiment depicted in FIG. 6, inner mandrel 20 is a single unit. However, it will be understood that there may be a first mandrel and a second mandrel as shown in FIG. 1. As will be understood by one skilled in the art, first and second mandrel will be connected together, and thrust sleeve 14 will typically be threaded onto the second mandrel. It will also be understood that the discussion below with respect to clamping the outer bearing stacks may also be used when a two part mandrel as described with respect to FIG. 1.

Once the inner race 12 is clamped, the outer race 24 may then be clamped. Referring to FIGS. 7 and 7a, the outer, or housing, race 24 is clamped between first shoulder 42 and outer shoulder 44. As shown, the first outer shoulder 42 is a deformable shim 26 and the second outer shoulder 44 is a non-deformable shim 27. It will be understood that the second outer shoulder 44 may also be a deformable shim 26, or there may be a deformable shim 26 at both shoulders. The first inner shoulder and the second inner shoulder will be a non-deformable shim. In the depicted embodiment, the deformable shim 26, is a stiff steel ring 26 of predetermined thickness in its cross-section, and may be referred to as a crush ring. The crush ring 26 follows a deformation curve that has at least a plastic deformation component when compressed across the predetermined range of compressive loads needed to maintain sufficient force against outer bearing races 24. The crush ring 26 is longer than the space provided such that, when the bearing housing 28 is assembled to the hand tight position by inserting the inner mandrel 20 into the outer housing 34, a gap 30 remains at the shoulder 32 of the connection. As the torque in the connection is increased to the desired torque, crush ring 26 compresses to apply an axial load to the housing bearing races 24, as shown in FIGS. 8 and 8a. If the torque is increased to the point where crush ring 26 begins to yield, permanent plastic deformation occurs in crush ring 26. By properly designing the crush ring 26, which may include the thickness of the crush ring 26, the profile of the crush ring 26, and the material of the crush ring 26, plastic deformation may begin before the crush ring 26 applies too much axial load to the housing bearing races 24 and therefore preventing damage to housing bearing races 24. The length of the crush ring 26 is preferably designed to be greater than the intended gap, but within the manufacturing tolerances, such that the deformation of the crush ring 26 is still within the necessary range of torque. Once the yield point of the crush ring 26 is reached and the connection continues to be torqued together, the axial load exerted on the housing bearing races by the crush ring 26 begins to decrease due to the shape and nature of the plastic deformation of the crush ring 26. Once the connection is completely torqued, the crush ring 26 is plastically deformed, resulting in the permanent deformation of the crush ring 26, with an appropriate load applied to the housing bearing races 24 to prevent individual race rotation.

Figure 9:
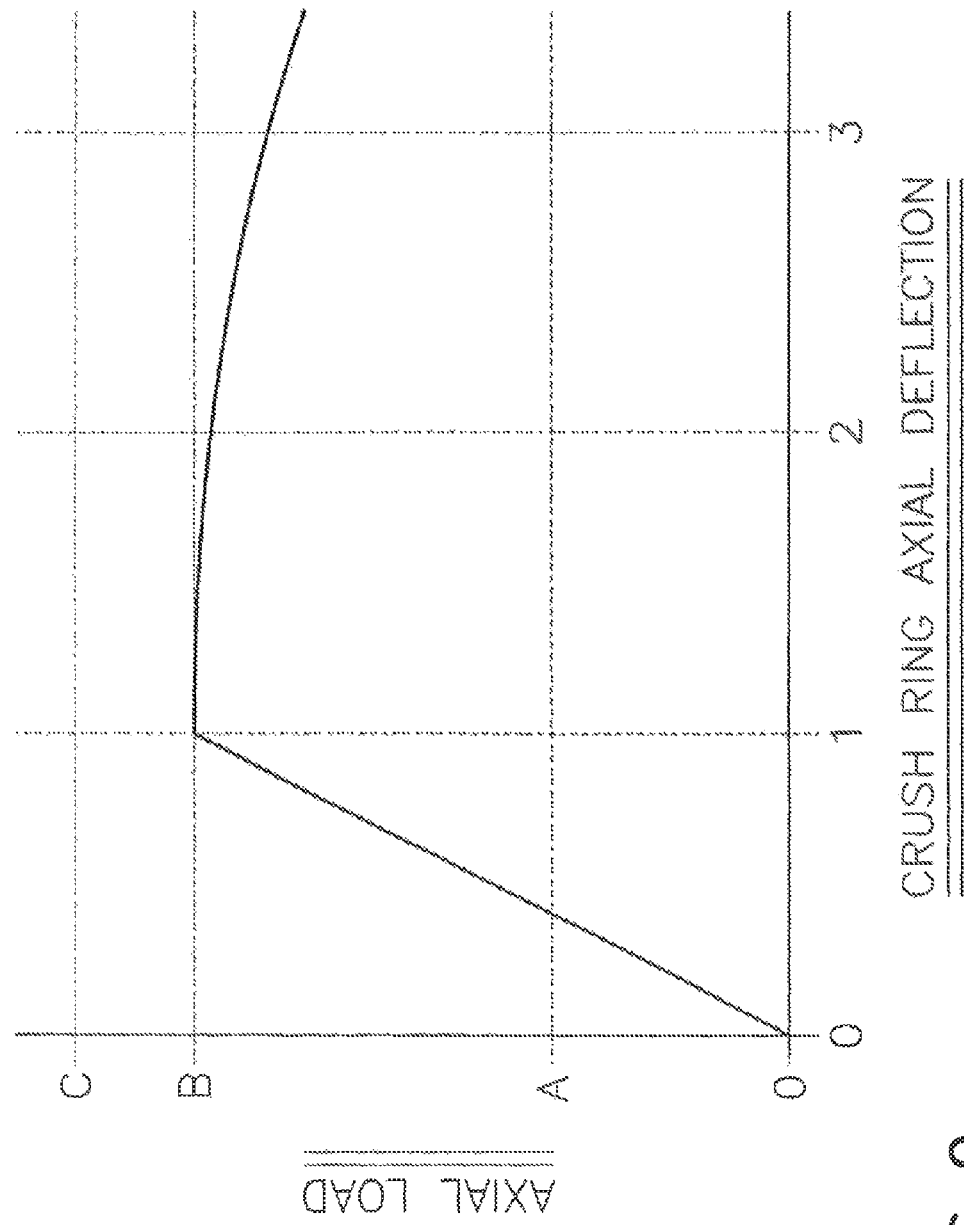
FIG. 9 is an illustration of the load/deflection curve for the preferred embodiment.

Referring to FIG. 9, the use of crush ring 26 for applying an axial load to the housing bearing races 24, is further explained. The graph is a typical representation of the axial load applied by the crush ring 26 on the housing bearing races 24 as the connection is torqued, as found in a particular example. The labelled points are as follows:

Axial Load—Due to Axial Deflection
 0=hand tight assembly
 A=minimum axial load required to prevent individual race rotation.
 B=elastic load limit, the maximum load clue to design and material.
 C=housing bearing race damage load.
Crush Ring Axial Deflection
 0=hand tight assembly.
 1=elastic limit, where there is no plastic deformation.
 2=mid-range deflection, the target for the crush ring with some plastic deformation.
 3=maximum plastic deformation of the crush ring.

Referring to the crush ring axial deflection axis, the portion of crush ring axial deflection occurring between 0 and 1 reaches the elastic limit of the crush ring 26. In other words, if the crush ring 26 is loaded to deflection 1, it will return to its original length when disassembled. The corresponding axial load B is larger than the minimum required, load A, and less than the housing bearing race damage load, load C. The axial deflection at 1 is equal to the minimum gap 30 that should be measured at the hand-tight assembly point, as is shown in FIGS. 7 and 7a.

The crush ring axial deflection from 1 to 3 is the target range where all resulting loads are acceptable to achieve the desired results. This range of crush ring axial deflection corresponds to the gap measured at the hand tight assembly point, shown in FIGS. 7 and 7a. Additionally, upon disassembly, the crash ring 26 retains its elastic limit at deflection 1. In other words, when disassembled and then reassembled, the gap 30 measured at the hand tight assembly, FIGS. 7 and 7a, will correspond to the crush ring axial deflection at 1. The corresponding axial load when the connection is torqued tight will match the plastic deformation load from the first assembly of the crush ring 26. The result is that the crush ring 26 maybe used several times upon reassembly. This can be easily checked in each reassembly by measuring the gap of the hand tight assembly, FIGS. 7 and 7a, to ensure it is not less than axial deflection 1.

As an example, the following are provided as real numbers for one embodiment. If crush ring axial deformation points 1, 2 and 3 are (0.030", 0.060" and 0.090" respectively, and axial load points A, B and C are 150,000 lbs, 350,000 lbs and 450,000 lbs respectively, then as long as the measured gap 30 of the hand tight assembly, FIGS. 7 and 7a, is between 0.030" and 0.090", an appropriate load between 150,000 lbs and 350,000 lbs will be applied to the housing bearing races when the connection is torqued tight. Deformable shim 26 follows a deformation curve defined such that within the predetermined range of compressive loads from A to C, the deformation curve has at least a plastic deformation component, resulting in compressing the plurality of outer races 24 leading to plastically deforming the deformable shim 26. However, the deformation curve preferably also has an elastic deformation component, and the deformable shim 26 is preferably also elastically deformed. In this example, bearing assembly 10 has an inherent elastic deformation of each of the components as a whole of about 0.030. In other words deformable shim 26 begins plastic deformation when gap 30 is reduced by 0.030 inches (i.e. at point A), and reaches a maximum plastic deformation of about 0.060 inches when gap is reduced by 0.090 inches (i.e. at point C). Preferably, bearing assembly 10 is set up such that closing gap 30 result in at least some plastic deformation of crush ring 26, such as at least 0.005 inches or more. The numbers provided above relate to one design of assembly 10, and it will be understood that the allowable gap, the inherent elastic deformation, and the amount of allowable plastic deformation in crush ring 26 may change depending on the design of assembly 10.

As can be seen from the load-deflection curve in FIG. 9, the axial load applied to the housing bearing races 24 is maintained within 20% of the maximum load B. The torque applied to the thrust sleeve to supply an axial load to the shaft bearing races is also maintained within 20% of their maximum load limit. This approach ensures that similar axial compressive stresses are applied to both the shaft and housing bearing races 12 and 24 to preserve appropriate load sharing between rows of ball bearings 46 and endplay between on-bottom and off-bottom loading.

Advantages

In this description, the axial deflection is allowed to proceed to a usable limit that simplifies the assembly process, while meeting the load/deflection requirements of the housing bearing races. It should be noted that the same mechanism might be used for the shaft bearing races. The most distinct advantage is a single assembly process that saves significant time and provides consistent results with regard to bearing race clamping loads. In terms of the housing bearing races, the measured gap at the hand tight assembly stage is 0.030" to 0.090" in the depicted example, where previous methods required accuracies of 0.005" and could require more than one attempt to achieve the proper clamping loads on both the shaft bearing races and the housing hearing races. The larger tolerance range from 0.030" to 0.090" ensures that every assembly provides proper bearing race clamping the first time.

Alternate Embodiments

Figure 10A:
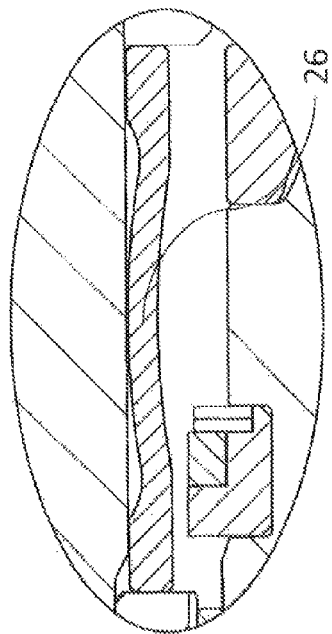
FIGS. 10-10a are detail cross-section views of the preferred embodiment.
Figure 11A:
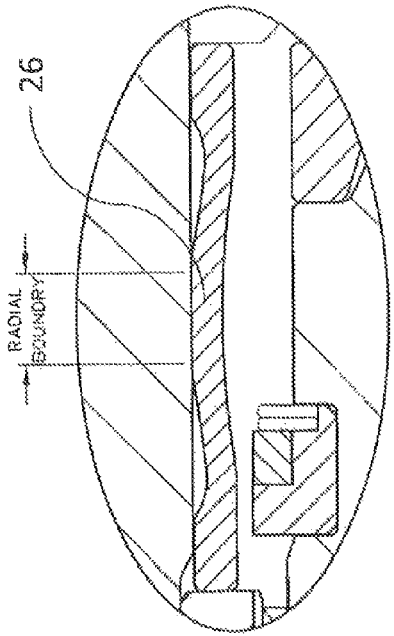
FIGS. 11-11a are detail cross-section views of an alternate embodiment.
Figure 10:
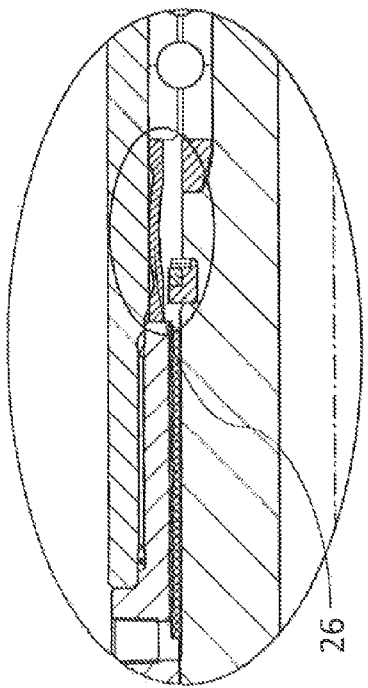
Figure 11:
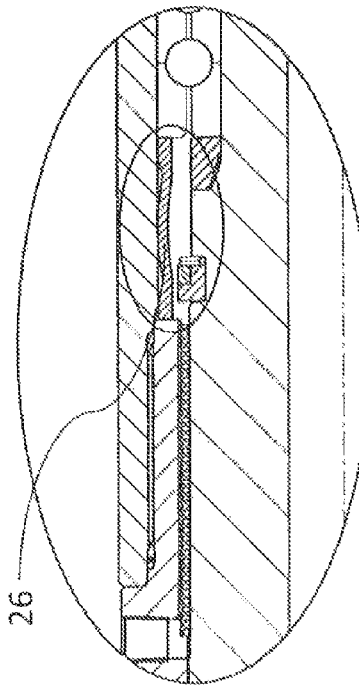
Figure 12:
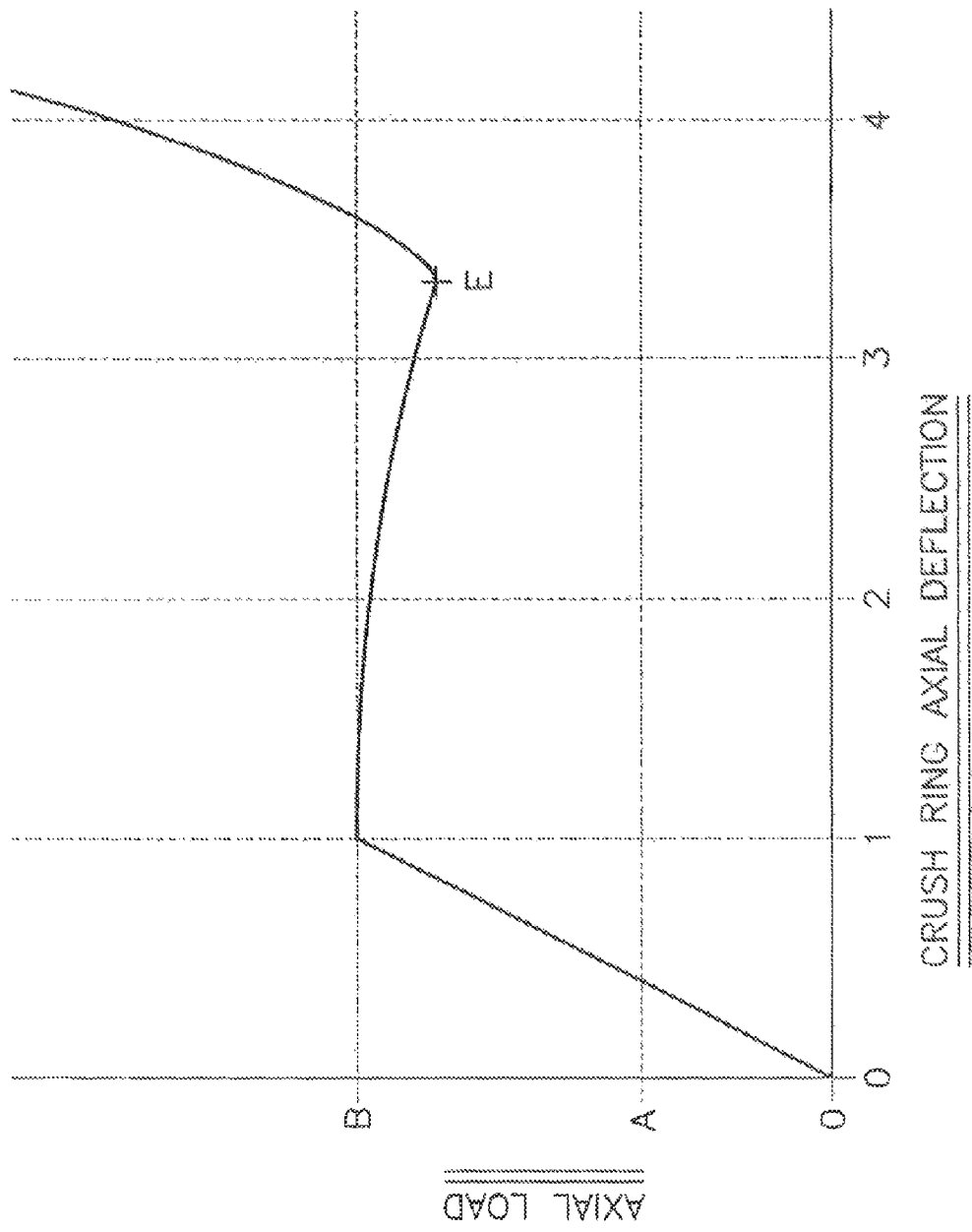

Load curves of varying load characteristics may be developed for different applications. Referring to FIGS. 10 and 10a, the selected axial deflection in this application allows for a radial expansion of the crush ring 26 to a point that is unbounded on its outside diameter for the useful axial deflection range. Alternative embodiments can be devised after examining what conditions arise if the axial deflection progresses beyond deflection point 3, shown in FIG. 9. Referring to FIGS. 11 and 11a, it can be seen that the crush ring will continue to expand in the radial direction until it contacts the inside diameter of the bearing housing. As shown in FIG. 12, the resulting load/deflection curve dramatically changes, from the contact point "E". This may be a desirable condition in some applications where it is desirable to limit axial deflection.

Other load/deflection characteristics may be achieved through altering simple geometry in the crush ring 26. FIGS. 13a to 13e demonstrate examples of possible geometries that may be used. FIG. 13f is an example of how alternate materials may be used to influence the radial growth of the crush ring 26 and change the load/deflection curve. Typical materials might be rubber, brass or an incompressible fluid if proper sealing was provided. Preferably, the deformable shim 26 comprises a shaped profile that defines a cavity into which the deformable shim 26 deforms under the compressive load.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A method of assembling a bearing assembly, comprising the steps of:
   mounting a bearing stack on an inner mandrel, the bearing stack comprising a plurality of inner races and a plurality of outer races;
   compressing the plurality of inner races between a first inner shoulder and a second inner shoulder to within a predetermined range of compressive loads, the first and second inner shoulders being carried by the inner mandrel;
   inserting the inner mandrel and bearing stack into an outer housing;
   compressing the plurality of outer races between a first outer shoulder and a second outer shoulder to within a predetermined range of compressive loads, the first and second outer shoulders being carried by the housing, wherein at least one of the first outer shoulder and the second outer shoulder comprises a deformable shim that follows a deformation curve having at least a plastic deformation component when compressed across the predetermined range of compressive loads.

2. The method of claim 1, wherein compressing the plurality of outer races comprises plastically deforming the deformable shim.

3. The method of claim 1, wherein the deformable shim is plastically deformed by at least 0.005 inches.

4. The method of claim 1, wherein the deformable shim is plastically deformed by at least 0.030 inches.

5. The method of claim 1, wherein the deformable shim is plastically deformed by no more than 0.060 inches.

6. The method of claim 1, wherein the deformation curve further comprises an elastic deformation component.

7. The method of claim 1, further comprising the step of manufacturing the deformable shim with a shaped profile that achieves a desired deformation curve.

8. The method of claim 1, wherein compressing the plurality of inner races comprises threading a sleeve onto the mandrel section, the mandrel section carrying the first inner shoulder and the sleeve carrying the second inner shoulder.

9. The method of claim 1, wherein the housing comprises a first section and a second housing section and compressing the plurality of outer races comprises threading the first housing section onto the second housing section, the first housing section carrying the first outer shoulder and the second housing section carrying the second outer section.

10. The method of claim 9, wherein the first housing section and the second housing section sealingly engage the inner mandrel on either side of the bearing stack.

11. The method of claim 1, wherein at least one other of the first inner shoulder and the second inner shoulder comprises a non-deformable shim.

12. A bearing assembly, comprising:
an inner mandrel;
an outer housing rotatably mounted to the inner mandrel; and
a bearing stack mounted between the inner mandrel and the outer housing, the bearing stack comprising:
a plurality of inner races compressively mounted between a first inner shoulder and a second inner shoulder to within a predetermined range of compressive loads, the first and second inner shoulders being carried by the inner mandrel;
a plurality of outer races compressively mounted between a first outer shoulder and a second outer shoulder to within the predetermined range of compressive loads, the first and second outer shoulders being carried by the outer housing; and
at least one of the first outer shoulder and the second outer shoulder comprising a deformable shim that follows a deformation curve that has at least a plastic deformation component when compressed across the predetermined range of compressive loads.

13. The bearing assembly of claim 12, wherein the deformable shim is plastically deformed by at least 0.005 inches as it is compressed to within the predetermined range of compressive loads.

14. The bearing assembly of claim 12, wherein the deformable shim is plastically deformed by at least 0.030 inches as it is compressed to within the predetermined range of compressive loads.

15. The bearing assembly of claim 12, wherein the deformable shim is plastically deformed by no more than 0.060 inches as it is compressed to within the predetermined range of compressive loads.

16. The bearing assembly of claim 12, wherein the deformation curve further comprises an elastic deformation component.

17. The bearing assembly of claim 12, wherein the deformable shim comprises a shaped profile that defines a cavity into which the deformable shim deforms under the compressive load.

18. The bearing assembly of claim 12, wherein the inner mandrel comprises a first mandrel section that carries the first inner shoulder and a sleeve section that carries the second inner shoulder, the sleeve section being connected to the first mandrel section by a mandrel threaded connection, and wherein the compressive load applied to the inner races is adjusted by adjusting the threaded connection.

19. The bearing assembly of claim 12, wherein the housing comprises a first housing section that carries the first outer shoulder and a second housing section that carries the second outer shoulder, the second housing section being threaded onto the first housing section by a housing threaded connection, and wherein the compressive load applied to the outer races is adjusted by adjusting the housing threaded connection.

20. The bearing assembly of claim 19, wherein the first housing section and the second housing section sealingly engage the inner mandrel on either side of the bearing stack.

* * * * *